(12) United States Patent
Agarwal et al.

(10) Patent No.: US 7,244,792 B2
(45) Date of Patent: Jul. 17, 2007

(54) PROCESS FOR MAKING A MODIFIED THERMOPLASTIC POLYESTER

(76) Inventors: Uday S. Agarwal, Stevertsemolen 11, 5612 DT Eindhoven (NL); Gerrit De Wit, Binnenweg 23, 4641 RX Ossendrecht (NL)

( * ) Notice: Subject to any disclaimer, the term of this patent is extended or adjusted under 35 U.S.C. 154(b) by 259 days.

(21) Appl. No.: 10/508,034

(22) PCT Filed: Mar. 14, 2003

(86) PCT No.: PCT/NL03/00191

§ 371 (c)(1),
(2), (4) Date: Apr. 28, 2005

(87) PCT Pub. No.: WO03/078502

PCT Pub. Date: Sep. 25, 2003

(65) Prior Publication Data

US 2005/0175783 A1    Aug. 11, 2005

(30) Foreign Application Priority Data

Mar. 20, 2002  (EP) .................................. 02076085

(51) Int. Cl.
*C08F 20/00* (2006.01)
*C08G 69/44* (2006.01)
*C08G 63/80* (2006.01)
*C08G 63/91* (2006.01)

(52) U.S. Cl. ..................................... 525/437; 528/268
(58) Field of Classification Search ................ 525/437; 528/288

See application file for complete search history.

(56) References Cited

U.S. PATENT DOCUMENTS

| 2,921,828 A | * | 1/1960 | Caldwell ........................ 8/495 |
| 4,590,259 A | * | 5/1986 | Kosky et al. ................ 528/272 |
| 5,837,803 A | * | 11/1998 | Nakano ........................ 528/332 |
| 5,895,809 A | * | 4/1999 | Wagner et al. ............... 528/322 |

FOREIGN PATENT DOCUMENTS

| EP | 729 994 | | 9/1996 |
| EP | 729994 A1 | * | 9/1996 |
| WO | 00/49065 | | 8/2000 |
| WO | WO 0049065 A1 | * | 8/2000 |
| WO | 02/18472 | | 3/2002 |
| WO | WO 0218472 A2 | * | 3/2002 |

OTHER PUBLICATIONS

English translation of JP 02-279737.*
Patent Abstracts of Japan, Abstract of JP 00 291 249, filed May 18, 1988.

* cited by examiner

*Primary Examiner*—Randy Gulakowski
*Assistant Examiner*—Alicia M. Toscano
(74) *Attorney, Agent, or Firm*—Mayer, Brown, Rowe & Maw LLP

(57) ABSTRACT

The invention relates to a process for making a modified thermoplastic polyester by reacting a thermoplastic polyester with a nitrogen-containing compound, wherein the thermoplastic polyester is first contacted in the solid state with an inert gas atmosphere containing at least one amino-compound of formula $H_2N-R-(X)_n$, wherein n is an integer $\geq 0$, R=a linear, branched or cyclo-aliphatic or aromatic residue comprising 1–24 C-atoms and optionally containing hetero atoms, $X=-NH_2$ or another functional group reactive with the polyester, at a temperature T(a) between room temperature and the melting point $T_m$ of the polyester, during at least 1 s; and then heated to a temperature T(b) between T(a) and $T_m$, during up to 10 hours; and thereafter solid state polymerized at a temperature T(c) between $(T_m-50)$ and $T_m$, during up to 100 hours, where $T(a)<T(b)<T(c)$.

The process according to the invention allows making a modified thermoplastic polyester in a relatively simple way, and can easily be applied to an existing polyester polymerization process, such that in addition to an unmodified thermoplastic polyester, a modified thermoplastic polyester can be produced starting from the same existing pre-polymer. With the process according to the invention properties like the crystallization behaviour can be adjusted in a customized way. Depending on the type of amino-compound that is used, a thermoplastic polyester with higher or lower crystallization rate may be made, whereas the amount of amino-compound used affects the degree of (crystallization) modification. Also other properties of the thermoplastic polyester may be modified, like its rheological behavior or its dyeability.

10 Claims, No Drawings

PROCESS FOR MAKING A MODIFIED THERMOPLASTIC POLYESTER

CROSS REFERENCE TO RELATED APPLICATION

This application is the National Phase of International Application PCT/NL03/00191 filed Mar. 14, 2003 which designated the U.S., and was published in the English language.

The invention relates to a process for making a modified thermoplastic polyester by reacting a polyester with a nitrogen-containing compound.

Such a process is known from an article published in Polymer Eng. Sci., 41(3), p. 466–474 (2001). This publication describes that polyalkylene terephthalates, especially polyethylene terephthalate (PET) or polybutylene terephthalate (PBT), can be modified by contacting the polyester in the melt phase, for example during extrusion, with a bis-esterdiamide, like N,N'-bis(p-carbomethoxybenzoyl) ethanediamine (T2T) or N,N'-bis(p-carbomethoxybenzoyl) butanediamine (T4T). Since the melt phase modification may result in significant lowering of the viscosity of the polyester, subsequent post-condensation in the solid state, often abbreviated as SSP (solid state polymerisation), may be needed to bring the viscosity back at a desired level. The cited publication further shows that PET modified with 0.1 or 1.0 mole% of T2T shows different crystallisation behaviour; that is, it crystallises more rapidly upon cooling from the melt than unmodified PET. The explanation given is, that a polyesteramide copolymer is formed via a transesterification reaction during the extrusion. The resulting diamide units in the polyesteramide polymer chain are thought to self-assemble in the melt phase via formation of hydrogen bonds, and to act as nucleators for crystallisation of the polymer upon cooling.

Polyethylene terephthalate is commercially a very important thermoplastic polyester, and is widely used in fibres, films and containers. Polyalkylene terephthalates, like PET, are generally prepared by a polymerisation process comprising first a melt phase polycondensation of an alkylenediol and terephthalic acid, or an ester-forming derivative thereof, into a pre-polymer, followed by a solid state post-condensation process to increase the molar mass of the polymer, and thus viscosity, up to a desired level. PET has a glass transition temperature ($T_g$) of about 80° C., a melting point ($T_m$) of about 250° C., and shows relatively slow crystallisation upon cooling from the melt, but generally crystallises fast upon molecular orientation. These properties are advantageously used in the above-mentioned applications. The use of PET as an engineering plastic, however, is rather limited, because its low rate of crystallisation hampers efficient processing by e.g. injection moulding techniques. In order to enhance the crystallisation rate of as produced PET, the addition of various nucleating agents has been reported, like mineral particles or metal carboxylates. As an alternative, introduction of specific diamide units into the polymer chain, that is making polyesteramide copolymers, has been shown to result in modification of the crystallisation behaviour. Such amide units can be introduced via copolymerisation of suitable monomers as disclosed in a.o. EP 729,994 A1, or by reacting a polyester with bisesterdiamides in the melt phase as mentioned above.

Disadvantages of the process known from the above cited article are that the bisesterdiamides first have to be synthesized, and that the melt phase modification generally again has to be followed by a SSP step, which makes this process less suited for modifying preformed thermoplastic polyester particles or for application in an existing thermoplastic polyester production process.

The aim of the present invention is to provide a process for making a modified thermoplastic polyester, e.g. showing crystallisation behaviour differing from the unmodified thermoplastic polyester, that is less complex than the known process, and can be flexibly applied to an existing polymerisation process.

This aim is achieved according to the invention with a process comprising the steps of (a) contacting the thermoplastic polyester in the solid state with an inert gas atmosphere containing at least one amino-compound of formula $H_2N—R—(X)_n$, wherein n is an integer $\geq 0$, R=a linear, branched or cyclo-aliphatic or aromatic residue comprising 1–24 C-atoms and optionally containing hetero atoms, $X=—NH_2$ or another functional group reactive with the thermoplastic polyester, at a temperature T(a) between room temperature and the melting point $T_m$ of the thermoplastic polyester, during at least 1 s;

(b) heating the thermoplastic polyester obtained in step (a) to a temperature T(b) between T(a) and $T_m$, during up to 10 hours; and (c) solid state polymerising the thermoplastic polyester obtained in step (b) at a temperature T(c) between ($T_m$–50) and $T_m$, during up to 100 hours, with T(a)<T(b)<T(c).

With the process according to the invention a modified thermoplastic polyester can be made in a relatively simple way. The modified thermoplastic polyester shows crystallisation behaviour that is different from the crystallisation behaviour of an unmodified thermoplastic polyester. The process according to the invention can easily be applied in an existing polyester polymerisation process, such that in addition to the unmodified thermoplastic polyester a modified thermoplastic polyester can be produced when desired starting from the same pre-polymer, for example an existing bottle- or fibre-grade PET.

A further advantage of the process according to the invention is that properties like the crystallisation behaviour can be adjusted in a customized way. Depending on the type of amino-compound that is used, a modified thermoplastic polyester with higher or lower crystallisation rate may be made, whereas the amount of amino-compound used affects the degree of (crystallisation) modification. A further advantage is that also other properties of the thermoplastic polyester may be modified, like its rheological behaviour or its dyeability, depending on the type and number of functional groups of the amino-compound used.

With an inert gas atmosphere is meant an atmosphere that does not react with nor otherwise negatively affects the thermoplastic polyester, and that does not interfere with the reaction of the amino-compound and the thermoplastic polyester. A suitable example of such atmosphere, that is preferably free of oxygen, is nitrogen gas.

JP 00 119,391 A discloses a process for making poly (ethylene terephthalate-co-ethylene terephthalamide) containing 5–50 mole % of amide units, by reacting polyethylene terephthalate with ethylenediamine in a specified solvent system, followed by separating and recovering the reaction product, and subsequent condensation polymerisation, e.g. SSP. The resulting polyesteramide copolymers show a higher temperature resistance, that is a higher glass transition temperature, than the starting polyester, but fairly unaffected melting and decomposition temperatures. This publication discloses contacting a thermoplastic polyester with an amino-compound, but clearly instructs that such contacting should be performed in a specific solvent phase during prolonged times to effect chemical modification. In addition, the crystallisation behaviour of the obtained copolymers is not addressed.

In WO 00 49,065 A1 a process for making a high molar mass thermoplastic polyester that is substantially free of catalyst is described, wherein a volatile treatment agent, acting as a catalyst for polycondensation, is added to a thermoplastic polyester during solid state polymerisation and subsequently removed again. Although a comonomer is mentioned within a list of other volatile treatment agents that might be added to the thermoplastic polyester via such a process, this publication is completely silent on using an amino-compound, let alone on modifying the crystallisation behaviour of the so-obtained modified thermoplastic polyester in this way.

U.S. Pat. No. 4,590,259 discloses a process of making high molar mass thermoplastic polyesters with a reduced proportion of acid end-groups, by contacting a thermoplastic polyester of certain particle size in the solid state with a mixture of an inert gas and an aliphatic diol, followed by solid state polymerisation. This publication, however, does not teach or suggest that also an amino-compound could be used to modify the thermoplastic polyester under similar conditions, in order to e.g. modify the crystallisation behaviour of the thermoplastic polyester.

Utika et. al. disclose in the Journal of the Osaka Research Institute of Technology, vol. 37(3), 1986 (Aminolysis reaction of polyethylene terephthalate fabrics with ethylene diamine vapor), a process for preparing a modified thermoplastic polyester by adding water to generate a hydrolysis reaction, as a result of which an additional decrease in the molecular weight is obtained. A consecutive solid state polymerisation is absent.

In the process of the present invention this water treatment is not needed; preferably the process is carried out in a water-free environment.

The process according to the present invention can in principle be used to modify any thermoplastic polyester or copolyester. Suitable thermoplastic polyesters include the crystallisable homo- and copolymers of dicarboxylic acids or ester-forming derivatives thereof, like terephthalic acid, isophthalic acid, 2,6-naphthalene dicarboxylic acid, adipic acid, or sebacic acid, with one or more diols, for example an alkylene glycol, preferably a C2–C10 alkylene glycol (such as ethylene glycol, 1,3-propylene glycol, 1,4-butylene glycol), or 1,4-cyclohexanedimethanol. Preferably, the thermoplastic polyester is a polyalkylene terephthalate, like PET, PBT, polypropylene terephthalate (PPT), polycyclohexylenedimethylene terephthalate (PCT) or copolymers thereof. These thermoplastic polyesters are used in various applications, each application requiring specific optimum crystallisation behaviour. With the process according to the invention it is possible to post-modify an existing grade, but also to directly produce a modified grade in an existing polymerisation plant starting from existing thermoplastic polyester pre-polymer, in both cases making a modified thermoplastic polyester with properties attuned to the specific requirements. Even more preferably, the thermoplastic polyester is PET since the crystallisation behaviour of this polymer plays a dominant role in many of its applications. For a PET composition to be used as engineering plastic, the crystallisation rate of PET is preferably increased, whereas for some other applications, like transparent sheets, a lower crystallisation rate may be more advantageous.

In the process according to the present invention an amino-compound is used that has at least one primary amine-group ($-NH_2$) and optionally one or more other functional groups (X) that are reactive with the thermoplastic polyester. "Reactive with the thermoplastic polyester" means that the group can react with one or more of the end-groups of a thermoplastic polyester, generally carboxyl- and/or hydroxyl-groups, and/or with ester-moieties in the thermoplastic polyester chain. Suitable reactive groups are known to the skilled person, and include amine-, hydroxyl-, carboxyl-, anhydride-, ester-, acid chloride-, isocyanate-, epoxide-, or oxazoline-groups. Examples of suitable amino-compounds include diamines, triamines, aminoacids, aminoesters and aminoalcohols. Preferably, the reactive groups are all primary amine-groups. This allows controlled reaction under a set of conditions, and random incorporation of the compound into the thermoplastic polyester. Preferably, the amino-compound has one, two or three reactive groups, that is n=0, 1 or 2 in formula $H_2N-R-(X)_n$. Amino-compounds with n=0 can be used to specifically introduce endgroups $-R$ into the polyester. More preferably, a compound with n=1 is used. Such a bifunctional compound can be incorporated into the thermoplastic polyester as a comonomer by reaction of both reactive groups, and may be randomly distributed over the polymer chain. Compounds with n=2 may be advantageously used to introduce a controlled chain branching, and influence the rheological behaviour of the modified thermoplastic polyester thus obtained. A further advantage of using a compound with n=2 is that a smaller decrease of viscosity of the modified thermoplastic polyester results, and less post-condensation may be needed. Use of a combination of two or more compounds having n=1 and n=2 may offer special advantages; like allowing a relatively high degree of modification with only minor viscosity reduction. An amino-compound of higher functionality ($n \geq 3$) can also be used, but may result in excessive chain branching, local gel-formation or even crosslinking, and may deteriorate the thermoplastic behaviour of the thermoplastic polyester.

In a specific embodiment, the amino-compound is a diamine, that is n=1 and $X=-NH_2$. By using such a compound as the amino-compound in the process according to the invention, a modified thermoplastic polyester comprising amide-groups may be produced in a flexible way, as an alternative to copolymerisation of different starting monomers.

The residue R in the amino-compound of formula $H_2N-R-(X)_n$ is a linear, branched or cyclo-aliphatic, or aromatic residue comprising 1–24 C-atoms and optionally containing hetero atoms. Examples of hetero atoms that may be present in R include N, O, Si, S, or a halogen. The advantage thereof is that properties like polarity of the compound may be altered, and in that way also properties of the modified thermoplastic polyester obtained by the process according to the present invention. For example, the compatibility of the modified thermoplastic polyester with other compounds, both low molar mass compounds like additives, and high molar mass compounds like other polymers, may be improved. In this way, also dyeability of a fibre made from the modified thermoplastic polyester may be improved.

Residue R comprises preferably such a number of C-atoms, that the amino-compound has a boiling point, such that under time, temperature and pressure conditions applied in steps (a) and (b) of the process according to the present invention it will result in a vapour pressure high enough to allow migration or absorption of an amount of that compound into the thermoplastic polyester, e.g. resulting in a modified thermoplastic polyester containing at least 0.01 mass % of nitrogen, and subsequent removal of excess compound, respectively. Boiling point and volatility of the amino-compound are not only dependent on the number of C-atoms in R, but also on the number and type of hetero atoms and X-groups.

In a preferred embodiment of the process according to the present invention, an amino-compound is used that is of substantially the same size as the major diol monomer comprised in the thermoplastic polyester. Substantially the same size can for example result when the number of C-atoms, and optionally other atoms, is the same or similar to the major diol component. The advantage hereof is, that the crystalline structure of the thermoplastic polyester is not disrupted. On the contrary, if the amino-compound is of the same size when incorporated into the thermoplastic polyester chain, it may fit into the thermoplastic polyester crystalline ordering. For example, in case a diamine is used, the compound may at least partly be incorporated as a bisamide into the thermoplastic polyester. Since hydrogen bonding between amides tends to be stronger than between ester units, enhanced inter- and intramolecular interaction may result. This can lead to initial formation of crystallites when cooling a melt at lower under-cooling, i.e. at higher temperature, and at higher rate. Such modified thermoplastic polyester may therefore show nucleated crystallisation behaviour. In addition, enhanced intermolecular interaction may result in a higher glass transition temperature, and/or in higher crystallinity. For the same reasons the amino-compound is preferably the diamine-analogue of the major diol monomer comprised in the thermoplastic polyester. To be more specific, for modifying PBT preferably 1,4-diaminobutane is used, and for modifying PET preferably ethylenediamine is used. The advantage of the latter is that a modified thermoplastic polyester is obtained that is nucleated, and shows improved crystallisation behaviour, making it very suitable for injection moulding applications.

In another embodiment of the process according to the invention, an amino-compound is used that is a molecule of dissimilar size as the major diol monomer comprised in the thermoplastic polyester. Dissimilarity in size can for example result when the number of C-atoms, and optionally other atoms, is quite different from the number of C-atoms of the major diol component. For example: using an amino-compound with a branched aliphatic or an aromatic R residue comprising at least 6 C-atoms in combination with a thermoplastic polyester comprising a short linear aliphatic diol, like ethylene glycol or butylene glycol. The advantage hereof is, that the crystalline structure of the thermoplastic polyester will be disrupted, and a modified thermoplastic polyester is obtained that shows a lower rate of crystallisation, or is even substantially amorphous in character.

The amount of the amino-compound that is used in the process according to the present invention determines the extent of modification of the thermoplastic polyester, and the extent in which properties of the thermoplastic polyester are altered. For example, incorporation of only a few mole % of a suitable amino-compound may already have a nucleating effect, whereas several mole %, e.g. about 10 or more mole % may be needed to turn a crystallisable thermoplastic polyester into a substantially amorphous copolymer. The process according to the present invention is found to be most advantageous for relatively low extents of modification; generally less than 20 mole % of amino-compound, preferably less than 15, more preferably less than 10, and even more preferably less than 5 mole %, based on diol monomers in the thermoplastic polyester, is present in the modified thermoplastic polyester. The modified thermoplastic polyester preferably contains less than 2 mass% of nitrogen, more preferably less than 1.5, and even more preferably less than 1 mass % N. Higher modification levels are possible, but distribution of the incorporated groups may be less homogeneous, and the process may be less advantageous in cost compared to conventional alternatives, like copolymerisation. The process is preferably used for preparing modified thermoplastic polyesters of only low extent of modification. Too low a level of modification may not result in any desirable effects, therefore the modified polyester preferably contains more than 0.01 mass % N, more preferably more than 0.05, even more preferably more than 0.1 mass % N.

In the process according to the invention, step (a) is performed at a temperature T(a) between room temperature and the melting point $T_m$ of the thermoplastic polyester, T(a) amongst others depending on the volatility and reactivity of the amino-compound used. $T_m$ and other thermal transition parameters are generally determined from DSC analyses, using standard methods. Preferably, the temperature used is above the glass transition temperature ($T_g$) of the thermoplastic polyester, because of easier and more homogeneous diffusion of the amino-compound into the thermoplastic polyester. The temperature is preferably also close to or above the boiling point of the amino-compound (at the applied pressure). Preferably, the temperature at step (a) is between 50 and 200° C.; more preferred between 80 and 150° C.

Preferably, the pressure in step (a) is about atmospheric, although a slight underpressure can also be applied. Any inert gas atmosphere may be applied, that does not interfere with the reaction of the amino-compound and the thermoplastic polyester, and which does not negatively affect properties of the thermoplastic polyester in another way. For cost reasons, nitrogen gas is preferred. The time for contacting in step (a) is chosen such that a desired amount of amino-compound is taken up by the thermoplastic polyester, and will depend on for example the type of amino-compound and the type of thermoplastic polyester, the concentration of compound in the gas atmosphere, and the temperature. The time is at least one second, but may be as long as up to several hours. Preferably, the contact time is of the order of 1–60 minutes.

In step (b) of the process according to the present invention the temperature is increased to remove excess of amino-compound and/or to (further) react the amino-compound with the thermoplastic polyester. Depending on the type and amount of the amino-compound and the thermoplastic polyester, and the conditions applied in step (a), this step (b) may prove to need not more than 1 minute, whereas on the other hand heating the thermoplastic polyester exposed to the amino-compound as obtained in the previous step (a) up to 10 hours may be desirable and advantageous for completing the reaction. Another advantage of this step (b) is that the crystallinity of the thermoplastic polyester may increase, which will prevent sticking together of particles, especially at the higher temperatures applied in step (c).

The temperature used in this step (b) is greater than the temperature in step (a). Preferable the temperature in step (b) is between 130 and 220° C.

During step (c) of the process according to the present invention, the modified thermoplastic polyester is further heated at a temperature of from about 50° C. below the melting point $T_m$ of the modified thermoplastic polyester up to closely below $T_m$. The temperature used in this step (c) is greater than the temperature in step (b). Preferably the temperature in step (c) is less than 35° C. below the melting point $T_m$. During this step (c) a flow of inert gas can be applied, or the pressure may be reduced, in order to more easily remove reaction products, oligomers, etc. Such solid state post-condensation (SSP) is well known to the skilled person. Depending to the type of thermoplastic polyester, and the desired viscosity level of the final polymer, this SSP step may take up to several days, e.g. 100 hours. Generally, the SSP (step (c)) takes between about 5 and 15 hours, depending on the desired viscosity increase of the preceeding step(s).

The process according to the present invention may be performed as a batch process, but also as a continuous operation. It is also possible that steps (a), (b) and (c) form part of a continuous process wherein a gradual transfer from one set of conditions to another set of conditions takes place. In such a situation, it may be difficult to define distinct separate process steps (a)–(c) as discussed above. In such case, contacting the thermoplastic polyester with the amino-compound, reaction of these two, the removal of excess amino-compound, and SSP may more or less occur simultaneously.

The process according to the present invention can be applied to used in an existing production process for making a thermoplastic polyester, especially PET.

In a typical continuous PET production process, a pre-polymer is formed from terephthalic acid, ethylene glycol, optionally minor amounts of other monomers, and a catalyst system by a melt-phase polymerisation, often including first an esterification step followed by polycondensation. The resulting pre-polymer is than formed into solid particles by strand extrusion and granulation. These particles are initially in the amorphous state, and tend to soften and stick together when heated to a temperature above about 70° C. To avoid agglomeration of the particles into lumps that can plug the equipment, the particles are generally maintained under continuous movement while being heated to induce crystallisation, normally with a flow of a heated inert gas, like nitrogen. Once PET particles have a crystallinity of e.g. more than 30%, the risk of agglomeration is strongly decreased or even absent. The crystalline PET particles can now be further heated to temperatures above 200° C., and even closely below their melting point, to effect solid-state post-condensation until a desired viscosity level is reached. During SSP, generally a flow of inert gas like nitrogen is applied for temperature control of the particles, and to carry away reaction products, like ethylene glycol and acetaldehyde. Such a PET production process, and suitable catalysts and other additives, are known to the skilled person, and are amongst others described in the publications cited above and in textbooks like Ullmann's Encyclopedia of Industrial Chemistry, Vol. A21, p. 227–251 (VCH Publishers, 1992).

In applying the process according to the present invention to such a continuous PET production process, the amino-compound may be added according to step (a) with the inert gas atmosphere to substantially amorphous PET particles, just before or in the beginning of a crystallisation step. Further heating to a higher temperature with an inert gas flow during crystallisation may represent step (b) according to the invention, followed by solid-state post-condensation as step (c).

In a specific embodiment, the present invention deals with a process for making a nucleated polyethylene terephthalate, comprising the steps of contacting the PET in the solid state with an inert gas atmosphere containing at least ethylene-diamine.

The present invention will now be further elucidated with the following Examples and comparative experiments.

EXAMPLE I 15 grams of pellets of a fibre grade PET (supplied by Acordis (NL), coded as Baga) were placed in a wire-net bucket inside a 500 ml two-neck flask equipped with a dropping funnel and a condenser-receiver connected to a vacuum pump. The PET pellets were first dried, by heating the flask to 125° C. under reduced pressure (about 1.2 kPa) during 1 hour. After disconnecting the vacuum, 5 grams of ethylenediamine (EDA, obtained from Aldrich, dried over molecular sieves) were added drop-wise to the flask from the dropping funnel. The drops of EDA vaporized as they fell on the heated flask bottom, EDA vapour contacting the PET pellets through the wire-net bucket. After 5 minutes, excess of EDA was removed by applying vacuum to the flask. The temperature was subsequently increased, and maintained at 210° C. during 1 hour to allow further reaction of PET and EDA. After cooling, the modified PET pellets were removed from the flask. To allow better comparison with the comparative experiments, the pellets obtained were extruded with a co-rotating twin-screw mini-extruder (DSM Model RD11H-1009-025-4) at 275° C. into strands of approximately 1 mm diameter.

The extent of modification of the thermoplastic polyester with EDA was determined by measuring the nitrogen-content, using a CHN analyser (Perkin Elmer Series II CHNS/O analyser, model 2400).

The type of modification was investigated by NMR, using deuterated trifluoroacetic acid as a solvent, on a Varian Mercury Vx 400 spectrometer at 400 MHz. A lower chemical shift of part of the protons on the phenyl ring in PET was observed at $\delta=7.82$ ppm, versus $\delta=8.1$ ppm for protons on the phenyl ring with adjacent ester groups. The lower chemical shift can be ascribed to amide groups adjacent to the phenyl ring, resulting from a transamidation reaction of an ester group with EDA. From peak integration it is estimated that the $\delta=7.82$ ppm peak area is about 2% of the large $\delta=8.1$ ppm peak area. Although the limited accuracy of the peak resolution and integration does not exclude the possibility that part of the EDA may have reacted differently, e.g. at chain ends, this 2% figure compares well with 2.2 mol % of amide groups, that would result if it is assumed that all of the 0.31 mass % N has been incorporated into the modified thermoplastic polyester as amide groups.

The inherent viscosity (IV) of the modified thermoplastic polyester was determined on a 0.5 g/dl solution in a 50/50 m/m mixture of phenol/tetrachloroethane at 30° C. The weight average molar mass ($M_w$) was determined by GPC analysis using polystyrene standards and 5% hexafluoroisopropanol in chloroform as eluent.

The crystallisation behaviour was examined using a Perkin Elmer DSC-7 differential scanning calorimetry system. The melt crystallisation temperature $T_c$ was determined from the peak in the crystallisation exotherm observed by 1) heating the sample at a rate of 100° C./min to 310° C., 2) maintaining the sample at a temperature of 310° C. during 10 min, 3) cooling the sample at a rate of 20° C./min to 150° C. In this way the thermal and shear history effects, that may affect the crystallisation of the modified thermoplastic polyester, were eliminated.

EXAMPLE II

Part of the product obtained in Example I was post-condensed in the solid state at 220° C. under a nitrogen flow during 14 hours. Results of analyses, performed as described above, are depicted in Table 1.

Comparative Experiments A–C

As-received PET was evaluated as comparative experiment A. The effect of a conventional nucleating agent (talcum) was assessed by extruding PET with 0.3 mass % of talcum powder under conditions as indicated for Example 1 (comparative experiment C). For comparison, also the effect of only extruding PET was tested via comparative experiment B. All tests were done analogous to Example 1. The results are summarized in Table 1.

Reaction of PET with EDA vapour in the solid state to at least partly form amide groups, and thus a polyesteramide copolymer, is demonstrated by NMR experiments. Reaction of the PET with the amino-compound is also apparent from the lowering of the viscosity and the molar mass, which is stronger for Example 1 than observed in comparative experiment B or C. The viscosity may be brought again up to the starting level via post-condensation of the modified thermoplastic polyester in the solid state. The modified thermoplastic polyester shows markedly faster crystallisation behaviour than the unmodified thermoplastic polyester, as is demonstrated by the higher values found for $T_c$. The modified thermoplastic polyester as obtained with the process according to the present invention shows even a significantly higher $T_c$ than a thermoplastic polyester nucleated with a conventional nucleating agent, even though its viscosity is higher (Example II vs comparative experiment C). Normally, a higher viscosity is expected to reduce the rate of crystallisation from the melt, and to lower the $T_c$, which is indeed observed for Example I and II. The increase in $T_c$ found for the thermoplastic polyester modified according to the present invention may appear to be only small versus using talcum as nucleating agent, but such small increase may yet have considerable effect on the injection moulding behaviour of a thermoplastic polyester composition, and could represent a decisive factor in whether a moulded article can be produced economically competitive or not.

TABLE 1

| Example/experiment | N-content (mass %) | IV (dl/g) | $M_w$ (g/mol) | $T_c$ (° C.) |
|---|---|---|---|---|
| Example I | 0.31 | 0.37 | 26,000 | 216 |
| Example II | 0.31 | 0.61 | 74,400 | 213 |
| Comparative experiment A | | 0.62 | 61,200 | 198 |
| Comparative experiment B | | 0.50 | 41,200 | 200 |
| Comparative experiment C | | 0.51 | 41,700 | 210 |

The invention claimed is:

1. Process for making a modified thermoplastic polyester by reacting a thermoplastic polyester with a nitrogen-containing compound, comprising the steps of:
   (a) contacting the thermoplastic polyester in the solid state with an inert gas atmosphere containing at least one amino-compound of formula $H_2N-R-(X)_n$, wherein n is an integer $\geq 0$, R=a linear, branched or cycloaliphatic or aromatic residue comprising 1–24 C-atoms and optionally containing hetero atoms, $X=-NH_2$ or another functional group reactive with the thermoplastic polyester, at a temperature T(a) between room temperature and the melting point Tm of the thermoplastic polyester, during at least 1 s;
   (b) heating the thermoplastic polyester obtained in step (a) to a temperature T(b) between T(a) and $T_m$, during up to 10 hours;
   (c) solid state polymerising the thermoplastic polyester obtained in step (b) at a temperature T(c) between $(T_m-50)$ and $T_m$, during up to 100 hours, with T(a)<T(b)<T(c).

2. Process according to claim 1, wherein the thermoplastic polyester is a polyalkylene terephthalate.

3. Process according to claim 1, wherein the thermoplastic polyester is polyethylene terephthalate.

4. Process according to claim 1, wherein the amino-compound is a diamine, that is n=1 and $X=-NH_2$.

5. Process according to claim 1, wherein the amino-compound is of substantially the same size as the major diol monomer comprised in the thermoplastic polyester.

6. Process according to claim 5, wherein the amino-compound is the diamine analogue of the major diol monomer comprised in the thermoplastic polyester.

7. Process according to claim 6, wherein the thermoplastic polyester is polyethylene terephthalate and the amino-compound is ethylenediamine.

8. Process according to claim 1, wherein the amino-compound is of dissimilar size as the major diol monomer comprised in the thermoplastic polyester.

9. Process according to claim 1, wherein the temperature in step (a) is between 50 and 200° C.

10. Process according to claim 1, wherein the modified thermoplastic polyester contains 0.01–2 mass % N.

* * * * *